US011634348B2

(12) United States Patent
Wallace

(10) Patent No.: US 11,634,348 B2
(45) Date of Patent: Apr. 25, 2023

(54) SYSTEM AND METHOD FOR TREATING HYDROCARBON-CONTAINING FEED STREAMS

(71) Applicant: Enviro Water Minerals Company, Inc., Houston, TX (US)

(72) Inventor: Paul Steven Wallace, Austin, TX (US)

(73) Assignee: Enviro Water Minerals Company, Inc., Houston, TX (US)

( * ) Notice: Subject to any disclaimer, the term of this patent is extended or adjusted under 35 U.S.C. 154(b) by 302 days.

(21) Appl. No.: 16/775,537

(22) Filed: Jan. 29, 2020

(65) Prior Publication Data

US 2020/0239346 A1 Jul. 30, 2020

Related U.S. Application Data

(60) Provisional application No. 62/798,863, filed on Jan. 30, 2019.

(51) Int. Cl.
*B01D 37/00* (2006.01)
*C02F 9/00* (2006.01)
(Continued)

(52) U.S. Cl.
CPC .................. *C02F 9/00* (2013.01); *C02F 1/42* (2013.01); *C02F 1/444* (2013.01); *C02F 1/4693* (2013.01);
(Continued)

(58) Field of Classification Search
CPC ........ B01D 15/00; B01D 15/08; B01D 17/00; B01D 17/02; B01D 17/0202; B01D 37/00;
(Continued)

(56) References Cited

U.S. PATENT DOCUMENTS 6,508,936 B1 1/2003 Hassan
10,280,095 B1 5/2019 Garudachari et al.
(Continued)

FOREIGN PATENT DOCUMENTS

WO   2018208305 A1   11/2018

OTHER PUBLICATIONS

Igunnu et al., International Journal of Low-Carbon Technologies 2014, 9, 157-177 (Year: 2014).*

(Continued)

*Primary Examiner* — Allison G Fitzsimmons
(74) *Attorney, Agent, or Firm* — Fletcher Yoder, PC

(57) ABSTRACT

A water processing system includes a pretreatment system disposed within the water processing system. The pretreatment system may treat a feed stream including oil and brine and to generate a first brine stream. The pretreatment system includes a first filtration system that may receive the feed stream, the first filtration system may separate the feed stream into a hydrocarbon stream and an intermediate brine stream, the intermediate brine stream includes a plurality of minerals, and the hydrocarbon stream includes water, the oil, and suspended solids. The water processing system also includes a mineral removal system fluidly coupled to and disposed downstream from the first filtration system. The mineral removal system may receive and remove the plurality of minerals from the first brine stream output from the pretreatment system. The mineral removal system includes a first mineral removal unit that may remove a first portion of the plurality of minerals from the first brine stream and to generate a second brine stream. The water processing system also includes a hydrocarbon removal system disposed within the pretreatment system and fluidly coupled to the first filtration system. The hydrocarbon removal system may
(Continued)

receive the hydrocarbon stream, to recover the oil, and to generate a recovered oil stream.

21 Claims, 6 Drawing Sheets

(51) Int. Cl.
*C02F 101/32* (2006.01)
*C02F 103/36* (2006.01)
*C02F 1/469* (2023.01)
*C02F 101/10* (2006.01)
*C02F 1/42* (2023.01)
*C02F 1/44* (2023.01)

(52) U.S. Cl.
CPC ...... *C02F 2101/10* (2013.01); *C02F 2101/32* (2013.01); *C02F 2103/365* (2013.01); *C02F 2209/06* (2013.01)

(58) Field of Classification Search
CPC ............ B01D 37/04; B01D 2257/70; B01D 2257/702; B01D 2257/706; B01D 2257/80; B01D 2319/00; B01D 2319/02; C02F 1/00; C02F 1/001; C02F 1/28; C02F 1/42; C02F 1/58; C02F 1/68; C02F 1/685; C02F 1/686; C02F 1/687; C02F 1/688; C02F 9/00; C02F 2101/00; C02F 2101/30; C02F 2101/32; C02F 2103/00; C02F 2103/007; C02F 2103/008; C02F 2103/10; C02F 2301/00; C02F 2301/04
USPC ........................................................ 210/638
See application file for complete search history.

(56) References Cited

U.S. PATENT DOCUMENTS

| 10,940,439 | B1 | 3/2021 | Ahmed et al. |
| 2005/0279500 | A1* | 12/2005 | Heins ................. E21B 43/2408 159/901 |
| 2008/0237123 | A1 | 10/2008 | Marston |
| 2009/0107917 | A1* | 4/2009 | Capehart ................... C02F 9/00 210/207 |
| 2013/0233786 | A1* | 9/2013 | Posa ..................... B01D 17/10 210/259 |
| 2014/0151296 | A1* | 6/2014 | Moore ................. C02F 1/5236 210/683 |
| 2020/0308037 | A1 | 10/2020 | Mamoudi et al. |

OTHER PUBLICATIONS

MI Systems boasts $100 million valuation; Americas; Feb. 2019; p. 25; Growth Capital.

* cited by examiner

SYSTEM AND METHOD FOR TREATING HYDROCARBON-CONTAINING FEED STREAMS

CROSS REFERENCE TO RELATED APPLICATION

This application benefits from the priority of U.S. Provisional Patent Application No. 62/798,863, entitled "System and Method for Treating Hydrocarbon-Containing Feed Streams," filed Jan. 30, 2019, which is hereby incorporated by reference in its entirety.

BACKGROUND

The subject matter disclosed herein relates to treatment of brine steams, and more particularly, to a system and method for removing and recovering hydrocarbons, organic materials, and minerals from a brine stream.

BRIEF DESCRIPTION

Geological formations contain hydrocarbons (e.g., oil and gas) that are extracted for use in residential, commercial, and industrial applications. Hydrocarbon extraction operations generate byproducts that may need to be disposed and/or treated prior to disposal. For example, byproducts of hydrocarbon extraction are flowback and produced water (hereinafter together "Produced Water"). Generally, Produced Water includes naturally occurring water that is extracted along with the hydrocarbons from the geological formation along with any materials injected into the well and trace amounts of hydrocarbons and other organics. In addition, Produced Water may include other waters resulting from certain hydrocarbon extraction operations (e.g., formation fracturing, water flooding, steam flooding, etc.).

Produced Water is a brine stream that contains several components (e.g., dissolved hydrocarbons, suspended solids, salts, naturally occurring radioactive materials (NORM), among others) that may render it unsuitable for reuse and disposal without undergoing treatment. For example, certain Produced Water includes a salt content of between 35,000 milligrams/liter (mg/L) to greater than 300,000 mg/L. The increased salinity of the produced water may be unacceptable for reuse and/or disposable in certain environments without treatment. In addition to the high salinity of the Produced Water, the Produced Water contains hydrocarbons associated with the geological formation from which the produced water was extracted. The hydrocarbons may include free oil, dispersed oil, and/or dissolved oil. Moreover, the Produced Water may contain naturally occurring radioactive materials found in the associated geological formation. Inorganic and organic additives used during hydrocarbon extraction operations may also be present in the Produced Water. Accordingly, the Produced Water contains several components that may need to be removed, diluted, or neutralized via a treatment process such that the Produced Water may be reused. Instead of reuse, Produced Water often is disposed of (e.g., direct injection into the formation, which is becoming more restrictive due to seismicity concerns and other concerns of future contamination). Existing techniques for treating Produced Water generate undesirable waste. The waste generated by treatment of the Produced Water may increase the overall costs of Produced Water disposal due, in part, to treatment, storage and disposal costs. Therefore, an improved Produced Water treatment and disposal process that substantially reduces (or eliminates) waste byproducts that may decrease the overall cost of treating and disposing of brine streams (e.g., Produced Water) generated from extraction of hydrocarbons from geological formations and minimize concerns around current practices.

BRIEF DESCRIPTION

In a first embodiment, a water processing system includes a pretreatment system disposed within the water processing system. The pretreatment system may treat a feed stream including oil and brine and to generate a first brine stream. The pretreatment system includes a first filtration system that may receive the feed stream, the first filtration system may separate the feed stream into a hydrocarbon stream and an intermediate brine stream, the intermediate brine stream includes a plurality of minerals, and the hydrocarbon stream includes water, the oil, and suspended solids. The water processing system also includes a mineral removal system fluidly coupled to and disposed downstream from the first filtration system. The mineral removal system may receive and remove the plurality of minerals from the first brine stream output from the pretreatment system. The mineral removal system includes a first mineral removal unit that may remove a first portion of the plurality of minerals from the first brine stream and to generate a second brine stream. The water processing system also includes a hydrocarbon removal system disposed within the pretreatment system and fluidly coupled to the first filtration system. The hydrocarbon removal system may receive the hydrocarbon stream, to recover the oil, and to generate a recovered oil stream.

In a second embodiment, a method includes adjusting a pH of a feed stream in a water processing system to generate a pH adjusted feed stream. The feed stream includes hydrocarbons and a brine. The method also includes separating the hydrocarbons from the brine in the pH adjusted feed stream in a pretreatment system of the water processing system. The pretreatment system includes a filtration system that may receive the pH adjusted feed stream, that may separate the hydrocarbons from the brine, and that may generate a hydrocarbon stream and a first brine stream, and the first brine stream includes a plurality of minerals, and the hydrocarbon stream includes oil and suspended solids. The method also includes removing the plurality of minerals from the first brine stream in a mineral removal system disposed downstream from the pretreatment system. Removing the plurality of minerals from the first brine stream includes adjusting a pH of the first brine stream to a first pH in a first mineral removal unit, the first pH may selectively remove a first portion of the plurality of minerals from the first brine stream to generate a second brine stream including a second portion of the plurality of minerals. The method also includes generating a concentrated brine stream from second brine stream in the mineral removal system, directing the concentrated brine stream from the mineral removal system to a hydrochloric acid (HCl) and sodium hydroxide (NaOH) production system disposed downstream from and fluidly coupled to the mineral removal system, generating an HCl solution and a NaOH solution in the HCl and NaOH production system using at least a portion of the concentrated brine stream, and directing the HCl solution, the NaOH solution, or both to the first mineral removal unit to adjust the pH of the first brine stream.

In a third embodiment, a system includes a pretreatment system disposed within a water processing system. The pretreatment system includes a first filtration system that may receive a feed stream having oil and brine. The first filtration system may separate the feed stream into a hydrocarbon stream and a first brine stream. The first brine stream includes a plurality of minerals and the hydrocarbon stream comprises the oil, water, and suspended solids. The system also includes a hydrocarbon removal system disposed downstream from and fluidly coupled to the first filtration system. The hydrocarbon removal system may receive the hydrocarbon stream and may recover the oil and the suspended solids. The system also includes a mineral removal system fluidly coupled to a disposed downstream from the pretreatment system. The mineral removal system may receive and remove the plurality of minerals from the first brine stream and may output a concentrated brine stream. The mineral removal system includes at least one mineral removal unit that may remove a first portion of the plurality of minerals from the first brine stream and may generate a second brine stream. The system also includes a hydrochloric acid (HCl) and sodium hydroxide (NaOH) production system disposed downstream from and fluidly coupled to the mineral removal system. The HCl and NaOH production system includes an electrodialysis bipolar membrane (EDBM) that may receive the concentrated brine stream and may generate and HCl stream and a NaOH stream from the concentrated brine stream.

DRAWINGS

These and other features, aspects, and advantages of the present invention will become better understood when the following detailed description is read with reference to the accompanying drawings in which like characters represent like parts throughout the drawings, wherein.

Figure 1:
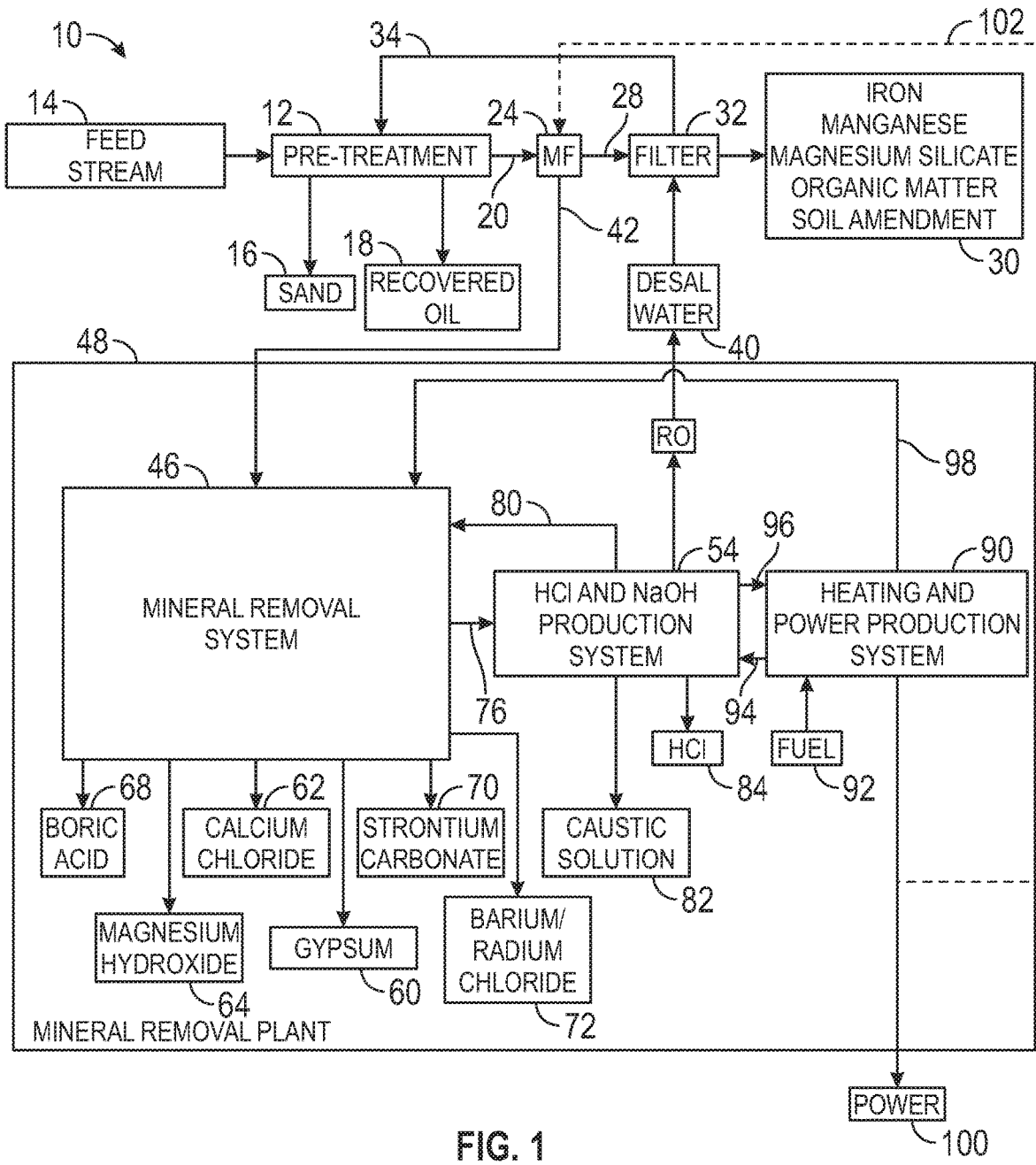
FIG. 1 is a block diagram of an embodiment of a water processing system, wherein the water processing system includes a pretreatment system fluidly coupled to a water removal plant having a mineral removal system and a hydrochloric acid (HCl) and sodium hydroxide (NaOH) production system downstream of the pretreatment system, in accordance with aspects of the present disclosure.
Figure 5:
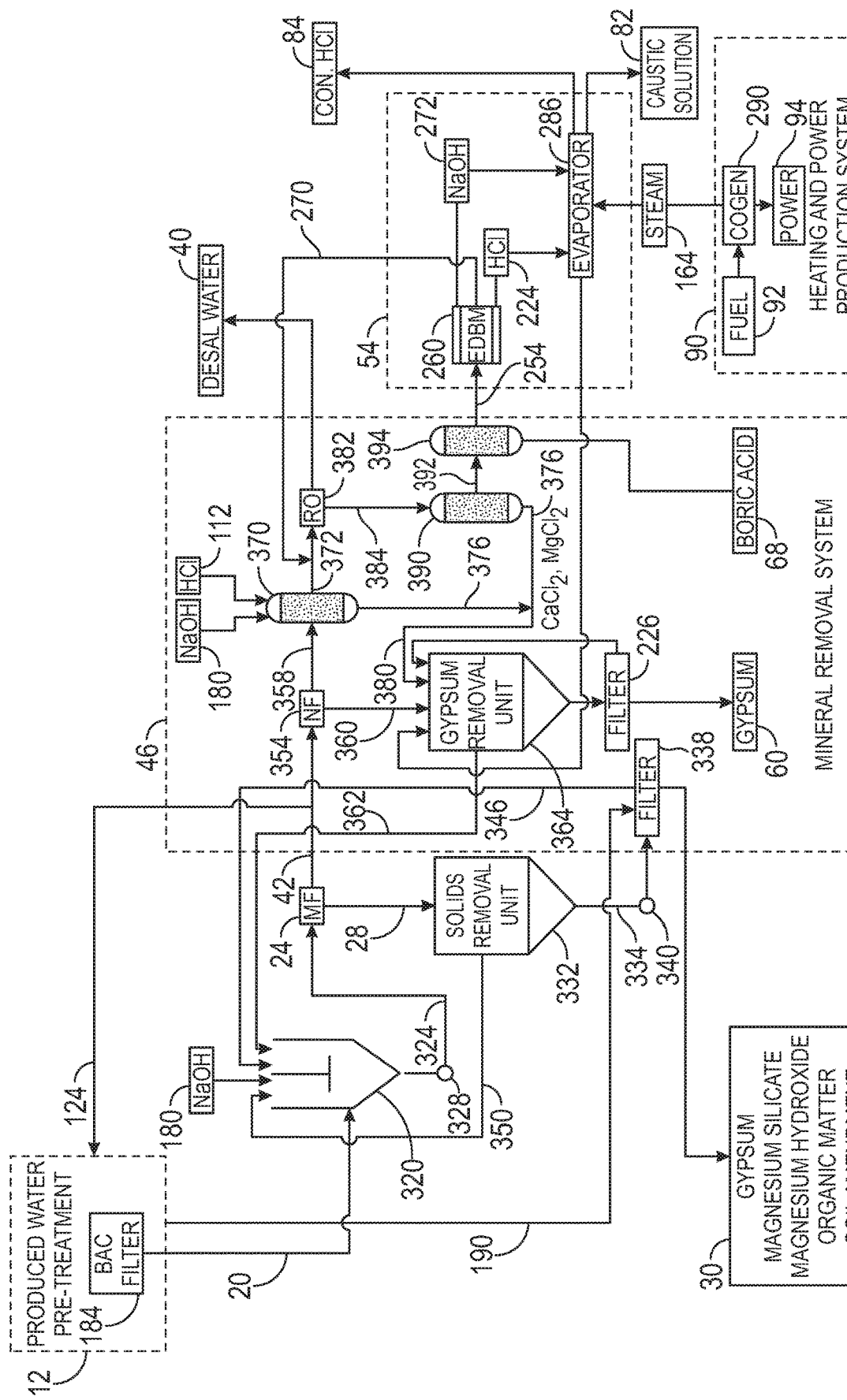
Figure 6:
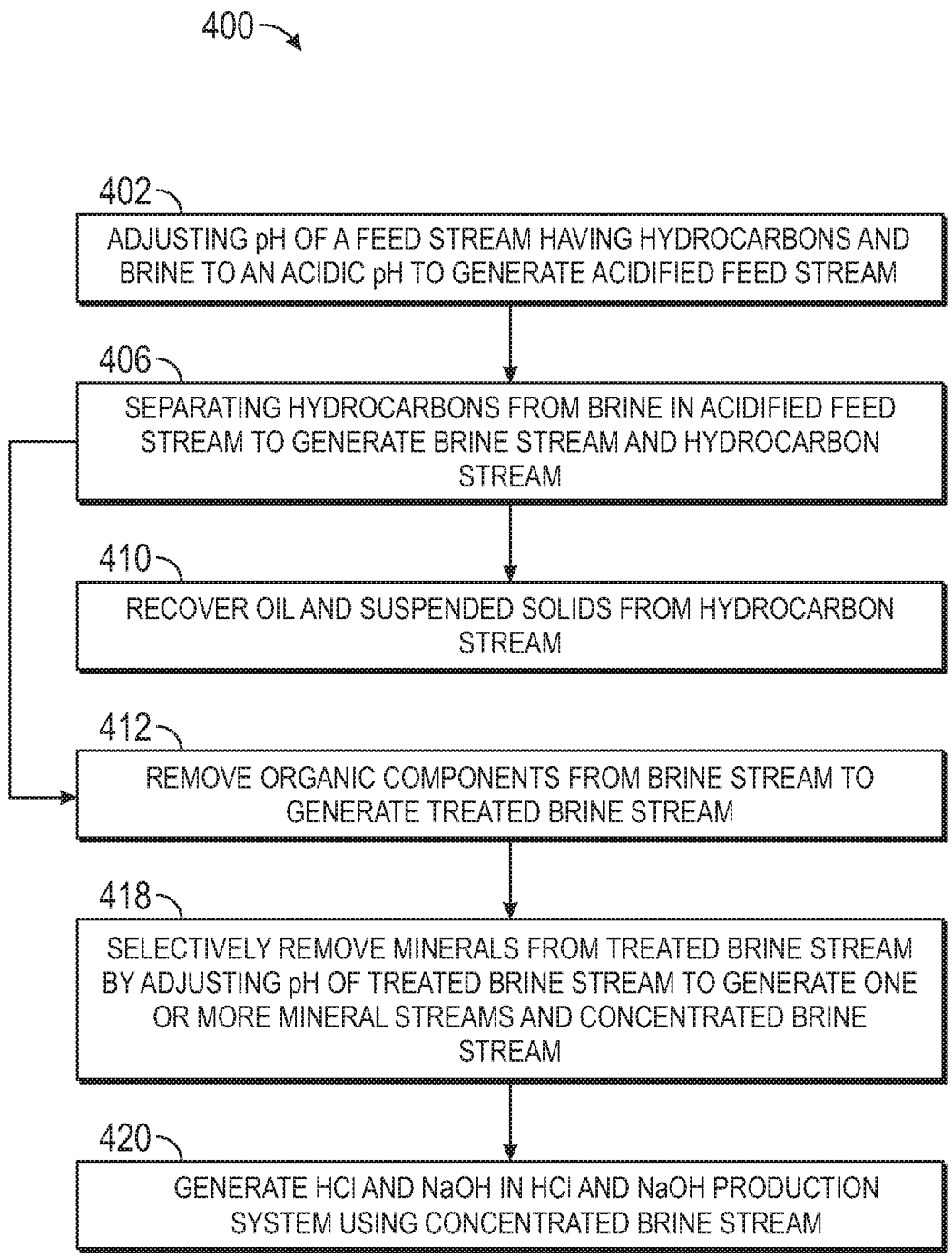

FIG. 5 is a block diagram of an embodiment of the water processing system of FIG. 1, wherein the mineral removal system includes ion exchange softeners for removal and recovery of minerals from the brine stream; and FIG. 6 is a flow diagram of an embodiment of a method for treating a brine stream to remove and recover hydrocarbons and other organic materials in the brine stream and generate hydrochloric acid and sodium hydroxide using the water processing system of FIG. 1.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in further detail below, embodiments include a water processing system configured to remove and recover chemical components present in a brine stream (e.g., produced water) in a manner that significantly reduces (or eliminates) generating waste byproducts. Brine streams generated during hydrocarbon extraction processes may have a salt content of between 2,000 milligrams/liter (mg/L) and 300,000 mg/L and include components such as, but not limited to, oil/grease (e.g., free oil, dispersed oil, and/or dissolved oil), inorganic compounds, organic compounds, and naturally occurring radioactive materials (NORM) (e.g., radium and uranium). Under certain conditions, these brine streams may be disposed of (or reused) by direct injection back into geological formations. However, in certain circumstances (e.g., due to composition of the brine stream, geological location, and regulations set forth by governing bodies), the brine stream is treated to remove undesirable components before disposal and/or reuse. Existing techniques for treating brines streams resulting from hydrocarbon extraction processes generate waste byproducts (e.g. sludge) that need to be disposed of, thereby increasing the overall cost of disposing and/or reusing of these brine streams. The brine streams may contain certain components (e.g., salt, minerals, organic acids, solids, etc.) that may have commercial value. However, certain existing techniques used for treating the brine stream are unable to recover commercially viable components from the brine steam. Therefore, it may be desirable to treat brine streams resulting from hydrocarbon extraction processing such that commercially viable components in the brine streams may be removed and recovered in a manner that significantly reduces (or eliminates) waste byproducts that otherwise require disposal.

For example, due to the high salt content (e.g., between approximately 2,000 mg/L and 300,000 mg/L) of certain brine streams, the brine streams may undergo a desalination process to recover the salt for in producing commercially viable hydrochloric acid (HCl) and/or caustic solution (sodium hydroxide (NaOH)). However, due, in part, to organic components (e.g., oil, organic acids, etc.) present in the brine stream, the brine stream is pretreated to remove the undesirable organic components prior to undergoing a desalination process. However, certain existing pretreatment processes used to pretreat the brine stream generally generate a sludge byproduct. The sludge byproduct is unusable and targeted for waste disposal, thereby increasing treatment and disposal costs for brine streams resulting from hydrocarbon extraction processes. Accordingly, present embodiments include a water processing system that may be used to remove and recover commercially viable materials present in the brine streams having hydrocarbon and other organic materials, while significantly reducing (or eliminating) waste byproducts. By using the disclosed water processing system for the handling of brine streams containing hydrocarbons and other organic components, costs associated with treatment and disposal of these brine streams may be decreased compared to existing techniques, which may generate additional waste byproducts that require disposal.

The water processing system disclosed herein includes a pretreatment system that is used in combination with a mineral removal system in a desalination plant. The pretreatment system includes filtration, stripping, biological treatment and optionally flotation and/or aerated storage systems to separate and recover certain materials from hydrocarbon containing brine streams that may affect the efficiency of downstream mineral removal and recovery processes in the mineral removal system. Following pretreatment of the brine stream (e.g., produced water), the treated brine stream may be processed in the mineral removal system to remove and recover commercially viable materials (e.g., calcium, magnesium, barium, salt (sodium chloride (NaCl)), among others) present in the brine stream, and to generate HCl and caustic (e.g., NaOH) in a hydrochloric acid (HCl) and sodium hydroxide (NaOH) production system located downstream of the mineral removal system. In this way, the disclosed water processing system may treat and recover commercially viable components from the brine stream in a manner that significantly reduces (or eliminates) generating waste that may need to be disposed of. Additionally, the disclosed water processing system provides a use for brine streams resulting from hydrocarbon extraction processes that would otherwise be disposed of.

FIG. 1 is a block diagram of an embodiment of a water processing system 10 that may use to treat a hydrocarbon-containing brine stream and recover commercially viable materials present in the produced water in a manner that significantly reduces (or eliminates) generating waste byproducts. For example, the water processing system 10 may be part of a water desalination system, wastewater treatment system, water purification system, oil and gas brine treatment system, or any other suitable water processing system. In the illustrated embodiment, the water processing system 10 is used to produce desalinated water from a feed stream (e.g., produced water) containing hydrocarbons and other organic components. In addition, the system 10 may remove and recovery minerals, salts, and other commercially viable materials that may be present in the hydrocarbon-containing brine stream. For example, the water processing system 10 may be used to produce soil amendment, magnesium hydroxide, boric acid, barite, high purity agricultural grade gypsum ($CaSO.2H_2O$) (e.g., approximately greater than 97 weight percent (wt %) gypsum on a dry basis), industrial grade caustic (e.g., approximately greater than 97 wt % sodium hydroxide (NaOH) on a dry basis), industrial grade magnesium hydroxide ($Mg(OH)_2$) (e.g., approximately greater than 95 wt % MgO on an ignited basis, or on an ignited oxide basis) suitable for industrial magnesia refractory, industrial grade calcium chloride ($CaCl_2$) (e.g., approximately greater than 90 wt % $CaCl_2$ on a dry basis), concentrated HCl for commercial use (e.g., approximately 4 wt % to 35 wt %), desalinated water (e.g., approximately less than 1 gram/Liter (g/L) (1000 parts per million (ppm)) total dissolved solids (TDS)), or a combination thereof, from produced water. Furthermore, the water processing system 10 may use a combination of one or more of gypsum precipitation, magnesium hydroxide precipitation, electrodialysis (ED), ion exchange and softening and membrane and filtration systems (e.g., microfiltration (MF), nanofiltration (NF), ultrafiltration (UF), reverse osmosis systems, vacuum cloth filters, pressure cloth filters) to remove the minerals from brines as industrial grade products and/or to substantially reduce (or eliminate) a waste byproducts.

In the illustrated embodiment, the water processing system 10 includes a pretreatment system 12 configured to receive a feed stream 14 (e.g., produced water). The feed stream 14 may be received from any suitable water source. For example, in certain embodiments, the feed stream 14 may be from a hydrocarbon extraction process (e.g., produced water). In other embodiments, the feed stream 14 may be received from ground water, seawater, brackish water, and so forth. The feed stream 14 may contain various elements and/or compounds. For example, the feed stream 14 may contain sodium chloride (NaCl), sulfate ($SO_4$), calcium (Ca), magnesium (Mg), and/or silicon dioxide (silica or $SiO_2$), or a combination thereof. In certain embodiments, the feed stream 14 may contain approximately 0.50 g/L (500 ppm) to approximately 350.00 g/L (350,000 ppm) NaCl, approximately 0.010 g/L (10 ppm) to approximately 1.50 g/L (1,500 ppm) $SO_4$, approximately 0.01 g/L (10 ppm) to approximately 8.0 g/L (8000 ppm) Ca, Mg, and Ba, approximately 0.001 g/L (1 ppm) to approximately 0.1 g/l (100 ppm) $B(OH)3$, approximately 0.01 (10 ppm) to 1 g/L (1000 ppm) $HCO3$ and/or approximately 0.01 g/L (10 ppm) to approximately 0.30 g/L (300 ppm) $SiO_2$, or a combination thereof. Furthermore, in certain embodiments, the feed stream 14 may have a pH range between approximately 5 and 9. For example, the feed stream 14 may have a pH of approximately 8.

As discussed above, the feed stream 14 may be a brine stream resulting from hydrocarbon extraction processes. Accordingly, the feed stream 14 may contain hydrocarbon and other organic components that may render the feed stream 14 unsuitable for treatment in downstream processes of the system 10. The feed stream 14 may contain emulsifiers (e.g., naphthenic acids) that stabilize the hydrocarbons in the feed stream 14. For example, the emulsifiers may solubilize the hydrocarbons in water. As such, the feed stream 14 may be a mixture of water, salts, hydrocarbons, and, in certain embodiments, suspended solids (e.g., sand and other solids). Therefore, as discussed in further detail below, the feed stream 14 may be treated with an acid (e.g., HCl) upstream, of the pretreatment system 12 to decrease a pH of the feed stream 14 to an acidic pH. The acidic pH of the feed stream 14 may destabilize the emulsion, such that the hydrocarbons and the water in the feed stream 14 separate.

The pretreatment system 12 receives the acidified feed stream 14 and removes suspended solid materials (e.g., sand 16) and hydrocarbons (e.g., recovered oil 18) from the acidified feed stream 14 to generate a pretreated brine stream 20 that does not contain hydrocarbons and other organic materials. The pretreatment system 12 provides the pretreated brine stream 20 to a microfiltration (MF) system 24 that separates solid materials generated in the pretreatment system 12 from the pretreated brine stream 20. For example, the MF system 24 may include plastic or ceramic filters that remove certain components present in the pretreated brine stream 20 and produce a brine stream 28 (e.g., MF non-permeate stream) that includes solid materials 30 separated from the pretreated brine stream 20. The solid materials 30 may include solids such as, but not limited to, iron (Fe), manganese (Mn), manganese silicate, and organic matter found in and/or generated from the feed stream 14. The brine stream 28 is directed to a first filter 32 (which may a sand or diatomaceous earth precoat) that captures and recovers the solid materials 30 in the brine stream 28. For example, the first filter 32 captures solids in the brine stream 28 to generate the solid materials 30 and a filtrate 34 (e.g., an aqueous brine stream). The filtrate 34 may be recycled back to the pretreatment system 12, as discussed in further detail below. In certain embodiments, the first filter 32 may be flushed with desalinated water 40, produced in a downstream process of the system 10, after removal of the solid materials 30 to wash the first filter 32. The filter wash may be combined with the filtrate 34 and fed to the pretreatment system 12.

In addition to the brine stream 28, the MF system 24 outputs a brine stream 42 (e.g., MF permeate stream) that contains dissolved salts and minerals (e.g., NaCl, $Ca^{2+}$, $SO_4^{2-}$, $Mg^{2+}$, etc.). The MF system 24 provides the brine stream 42 to a mineral removal system 46 downstream of the pretreatment system 12. In certain embodiments, the brine stream 42 may be approximately 80 percent to approximately 99 percent of the output from the MF system 24, and the brine stream 28 may be approximately 1 percent to approximately 20 percent of the output from the MF system 24. For example, in some embodiments, the brine stream 42 may be approximately 95 percent of the output from the MF system 24, and the brine stream 28 may be approximately 5 percent of the output from the MF system 24. As may be appreciated, while the illustrated embodiment uses the MF system 24, other embodiments may use an ultrafiltration (UF) system in place of the MF system 24.

The mineral removal system 46 may be part of a mineral removal plant 48. The mineral removal plant 48 is configured to remove minerals, elements, compounds, or combinations thereof, from the brine stream 42. The brine stream 42 may be provided to the mineral removal plant 48 from any suitable source and/or system. In certain embodiments, the brine stream 42 may include substantial amounts of salts, such as NaCl, sodium sulfate ($Na_2SO_4$), calcium (Ca), magnesium (Mg), boron (B), Strontium (Sr), or combinations thereof. The minerals, elements, and compounds present in the brine stream 42 may be recovered for commercial use. In addition, the NaCl in the brine stream 42 may be used to generate hydrochloric acid (HCl) and sodium hydroxide (NaOH) in a hydrochloric acid (HCl) and sodium hydroxide (NaOH) production system 54 of the mineral removal plant 48. The mineral removal system 46 may also output one or more desalination streams that include the desalinated water 40, which may contain $SiO_2$. Furthermore, the one or more desalination streams may include a disinfectant and/or oxidant.

During operation, the mineral removal system 46 may be configured to remove any suitable minerals, elements, compounds, or a combination thereof, from the brine stream 42. For example, the mineral removal system 46 may provide a gypsum stream 60 (e.g., agricultural grade gypsum), a calcium chloride stream 62 (e.g., industrial grade calcium chloride), a magnesium hydroxide stream 64 (e.g., industrial grade magnesium hydroxide), a boric acid (e.g. industrial grade boric acid (>99% $B(OH)_3$ stream 68, a strontium carbonate (e.g. industrial grade strontium carbonate (>95% $SrCO_3+BaCO_3$) stream 70, a barium/radium chloride stream 72, or a combination thereof, and/or other mineral streams depending on the mineral content of the brine stream 42.

The mineral removal system 46 may generate additional streams that may be collected for commercial use and/or utilized in a downstream process of the water processing system 10. In certain embodiments, the mineral removal system 46 may provide one or more output streams 76 to the HCl and NaOH production system 54. For example, the mineral removal system 46 may provide NaCl brine to the HCl and NaOH production system 54. The HCl and NaOH production system 54 may generate concentrated HCl via an ion separation process (e.g., EDBM process) followed by an evaporation process. Furthermore, the mineral removal system 46 may receive one or more input streams 80 from the HCl and NaOH production system 54. The one or more input streams 80 may provide the mineral removal system 46 with the HCl and/or caustic (e.g., NaOH) produced by the HCl and NaOH production system 54. In addition, the HCl and NaOH production system 54 may generate a caustic solution 82 (e.g., concentrated industrial grade NaOH) and/or a concentrated industrial grade HCl product solution 84 that is not used by the mineral removal system 46 (e.g., produced to be sold).

The mineral removal plant 48 also includes a heating and power production system 90. The heating and power production system 90 may include a natural gas engine and/or a boiler. The heating and power production system 90 may be configured to receive a fuel 92. The fuel 92 may be any suitable fuel, such as natural gas, synthetic natural gas (e.g., syngas), or combination thereof. The heating and power production system 90 may provide power, steam, hot water, any suitable heated fluid, and so forth to the HCl and NaOH production system 54, as indicated by arrow 94. Moreover, the heating and power production system 90 may receive a cooled fluid stream 96 (e.g., cooled water) from the HCl and NaOH production system 54. As illustrated, the heating and power production system 90 may also provide power to the mineral removal system 46, as indicated by arrow 98. Additionally, the heating and power production system 90 may provide power 100 to another system and/or the MF system 24, as indicated by arrow 102.

Figure 2:
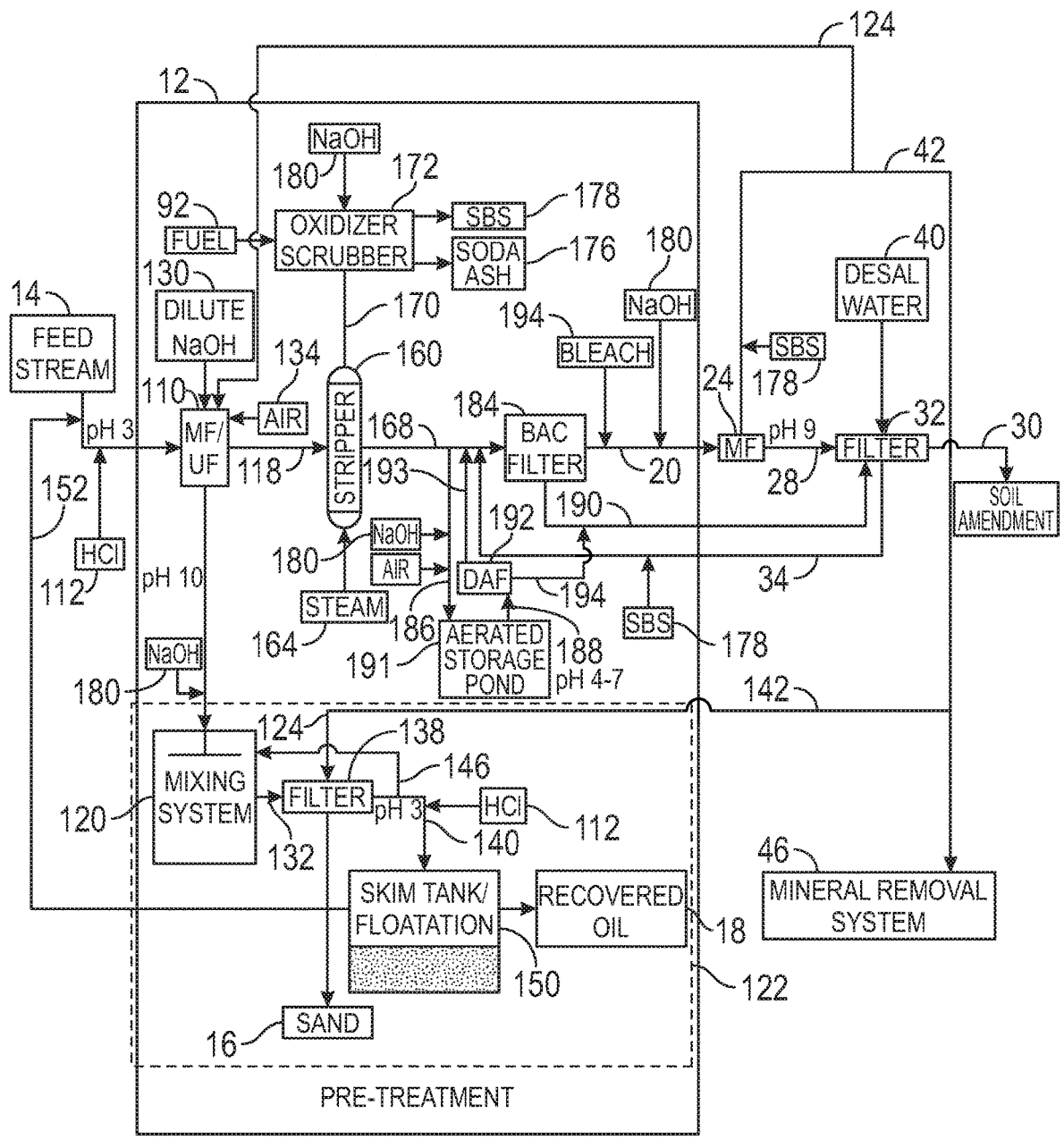
FIG. 2 is a block diagram of an embodiment of the pretreatment system of FIG. 1, wherein the pretreatment system includes a filtration system, an ion exchange softener, and a biological activated carbon (BAC) filter used to treat the brine stream and recover oil from the brine stream, in accordance with aspects of the present disclosure.

As discussed above, certain feed streams (e.g., the feed stream 14) may include components that may need to be removed before treating the feed stream in a mineral removal system, such as the mineral removal system 46. Accordingly, the feed stream 14 (e.g., Produced Water or other brine water) is provided to the pretreatment system 12. The pretreatment system 12 removes components, such as the sand 16 and oil/grease (e.g., the recovered oil 18) that may be present in the feed stream 14. FIG. 2 is a block diagram of an embodiment of the water processing system 10 that includes filtration and ion exchange systems within the pretreatment system 12 that facilitate removal of hydrocarbons, organic materials, and suspended solids present in the feed stream 14 that may result in undesirable effects in the mineral removal system 46. For example, in the illustrated embodiment, the feed stream 14 is directed to a filtration system 110. In certain embodiments, the filtration system 110 may be a microfiltration (MF) system. In other embodiments, the filtration system 110 may be an ultrafiltration (UF) system. The filtration system 110 separates hydrocarbons (e.g., oil/grease) and suspended solids (e.g., the sand 16) that may be present in the feed stream 14 from the aqueous brine that makes up the majority (e.g., approximately 90 percent to approximately 98 percent) of the feed stream 14.

Prior to directing the feed stream 14 to the filtration system 110, a pH of the feed stream 14 may be adjusted to an acidic pH (e.g., a pH of approximately 3 or less) by adding HCl 112 generated in the HCl and NaOH production system 54. Acidifying the feed stream 14 may facilitate separation of the hydrocarbons from the feed stream 14. For example, the feed stream 14 may include naphthenic acids that stabilize an emulsion between the hydrocarbons and the water (e.g., the aqueous brine). The emulsion increases the miscibility between the hydrocarbons and the water present in the feed stream 14. Therefore, it may be difficult to separate the hydrocarbons from the water. However, by decreasing the pH of the feed stream 14 to a pH of approximately 3 or less, the naphthenic acids are unable to stabilize the emulsion and, therefore, the hydrocarbons separate from the water in the feed stream 14. That is, the acid pH of the feed stream 14 deactivates the emulsifiers (e.g., the naphthenic acids) to break the emulsion, which results in separation of the two immiscible liquids (e.g., the hydrocarbons and the water).

Once the emulsifiers in the feed stream 14 are deactivated with the HCl 112, the acidified feed stream 14 is directed to the filtration system 110 to remove the separated hydrocarbons and suspended solids from the water to generate a hydrocarbon stream 116 and a first brine stream 118 (e.g., aqueous brine stream). As discussed in further detail below, the first brine stream 118 contains commercially viable components (e.g., salts, minerals, acids, etc.) that may be separated and recovered from the first brine stream 118 as commercially viable products. Similarly, the hydrocarbon stream 116 may contain components (e.g., the sand 16 and the recovered oil 18) that may be recovered as commercially viable products. For example, following separation of the hydrocarbons and suspended solids from the acidified feed stream 14, the hydrocarbon stream 116 is directed to a hydrocarbon removal system 122. The hydrocarbon removal system 122 includes a mixing system 120, a second filter 138, and a skim/floatation tank 150 that facilitate removal of the suspended solids (e.g., the sand 16) and recovery of hydrocarbons (e.g., the recovered oil 18). Upstream of the mixing system 120, a pH of the hydrocarbon stream 116 may be increased to an alkaline pH (e.g., a pH greater than approximately 9). For example, the hydrocarbon stream 116 may be treated with NaOH 180 downstream of the filtration system 110, thereby increasing the pH of the hydrocarbon stream 116 to an alkaline pH of greater than 9. The alkaline pH of the hydrocarbon stream 116 reactivates the naphthenic acids (e.g., emulsifiers). The activated naphthenic acids stabilize an emulsion between the hydrocarbons and any water that may be present in the hydrocarbon stream 116. For example, in the illustrate embodiment, a portion of the brine stream 42 may be directed to the filtration system 110, as shown by arrow 124. The portion 124 of the brine stream 42 may be used to wash the filtration system 110. The filtration system wash may be combined with the hydrocarbon stream 116. Therefore, by activating the naphthenic acids present in the hydrocarbon stream 116, the brine steam from the filtration system wash and the hydrocarbons present in the hydrocarbon stream 116 may be emulsified to form a stable mixture. In addition to the brine stream 124, the filtration system 110 may be washed using dilute NaOH 130 (e.g., a concentration of between approximately 0.1 percent and approximately 3.0 percent). The mixing system 120 may include an emulsification system or low shear/high shear mixing systems that facilitates emulsifying the hydrocarbon stream 116 and the brine stream 124 such that the hydrocarbons and brine stream 124 form a stable mixture. Accordingly, the sand 16 present in the hydrocarbon stream may be separated from the hydrocarbons. Scouring air 134 may be blown through the filtration system 110 to agitate the streams 124, 130 and facilitate washing/cleaning of the filtration system 110 and emulsification of the hydrocarbon stream 116.

Following emulsification, the mixing system 120 may output an emulsified hydrocarbon stream 132. The emulsified hydrocarbon stream 132 is directed to the second filter 138 that separates the sand 16 from the emulsified hydrocarbon stream 132, thereby generating a hydrocarbon filtrate stream 140. A second portion of the brine stream 42 may be fed to the second filter 138, as shown by arrow 142, to wash the sand 16 and remove any residual organics that may remain on the sand 16. In the way, the sand 16, free of any hydrocarbon contaminants, may be recovered and made available as a commercial product for sale.

The sand wash may be combined with the hydrocarbon filtrate stream 140. In certain embodiments multiple filter presses with periodic (batchwise) filter cake removal may be used. These may initially recycle the filtrate back to the mix tank 120 until a sand precoat builds up on the filter to allow collection of the fine sand particles in the filter cake. Accordingly, during initial operation of the filter after periodic cake removal a portion of the hydrocarbon filtrate stream 140 may be recycled to the mixing system 120, as illustrated by arrow 146. Recycling the portion 146 may allow for the fines that would initially pass through the second filter 138 to be recovered.

Following separation of the sand 16 from the emulsified hydrocarbon stream 132, hydrocarbons present in the hydrocarbon filtrate stream 140 may be recovered. For example, as discussed above, an acidic pH deactivates the naphthenic acids that stabilize the emulsion between the water and the hydrocarbons present in the hydrocarbon filtrate 140. Therefore, to recover the hydrocarbons, a pH of the hydrocarbon filtrate 140 is decreased from approximately 8 to 10 to an acidic pH of approximately 3 or less. The acidic pH breaks the emulsion such that the hydrocarbons and the aqueous brine are immiscible and may be separated in the skim/flotation tank 150. Therefore, following acidification of the hydrocarbon filtrate 140, the acidified hydrocarbon filtrate 140 is directed to the skim/flotation tank 150 to separate the hydrocarbons from the water and to generate the recovered oil 18 and a second brine stream 152. The recovered oil 18 may be made available as a commercial product that may be sold for use. The second brine stream 152 may contain residual amounts of hydrocarbons and therefore, is combined with the feed stream 14 upstream of the filtration system 110 and recycled back through the pretreatment system 12.

As discussed above, the feed stream 14 is directed to a filtration system 110 that separates the feed stream 14 into the hydrocarbon stream 116 and the first brine stream 118. The first brine stream 118 is an aqueous stream that includes water soluble components (e.g., salt, minerals, organic acids, light hydrocarbons, carbon dioxide, hydrogen sulfide, etc.) that may be removed from the first brine stream 118, recovered, and sold as commercial products. For example, following filtration in the filtration system 110, the first brine stream 118 is directed to stripper 160 (e.g., a vacuum stripper). In the stripper 160, volatile components (e.g., hydrocarbons having a boiling point less than a boiling point of water, carbon dioxide, hydrogen sulfide) in the first brine stream 118 are removed. As used herein, the term "volatile components" is intended to denote compounds having a boiling point less than a boiling point of water (e.g., less than approximately 100 degrees Celsius (° C.). For example, the first brine stream 118 may include light hydrocarbon compounds (e.g., hydrocarbons having less than approximately 6 carbon atoms ($C_6$)). The first brine stream 118 may be heated in the stripper 160 to volatilize the volatile components present in the first brine stream 118, thereby removing them from the first brine stream 118. For example, the stripper 160 may receive steam 164 generated in the heating and power production system 90 of the mineral removal plant 48. The steam 164, under a vacuum, may strip the light hydrocarbons from the first brine stream 118 to generate a stripped brine stream 168 and volatiles stream 170. The volatiles stream 170 may be fed to an oxidizer/scrubber 172 that scrubs and oxidizes the light hydrocarbons in the volatiles stream 170 to generate soda ash 176 (e.g., sodium carbonate ($Na_2CO_3$)) and sodium bisulfite (SBS ($NaHSO_3$)) 178. For example, the oxidizer/scrubber 172 may receive fuel 92 (e.g., natural gas) and NaOH 180 to thermally oxidize and scrub the volatiles stream 170, thereby generating the soda ash 176 and SBS 178. The soda ash 176 and/or the SBS 178 may be used in downstream processes of the system 10 to facilitate removal and recovery of components of interest from the first brine stream 118, as discussed in further detail below.

Following the stripper 160, the stripped brine stream 168 may be directed to a biological activated carbon (BAC) filter 184 or to an aerated intermediate storage pond 191, as shown by arrow 186. The stream 186 may be treated with sodium hydroxide from the HCl and NaOH production system 54 to increase the pH to near neutral (pH 5-7). Storage pond effluent 188 may contain algae from biological growth and may be treated with a dissolved air flotation (DAF) system 192 to remove most of the algae in a backwash stream 194. A treated underflow 193 from the DAF system 192 is routed to the BAC filter 184. The BAC filter 184 may remove dissolved organic components that may be present in the stripped brine stream 168 and filter out any fine algae particles. For example, the BAC filter 184 may include microorganism (e.g., bacteria) that treat the stripped brine stream 168 via biological oxidation of dissolved organic components present in the stripped brine stream 168, thereby removing the dissolved organic components from the stripped brine stream 168 and generating the pretreated brine stream 20. Treating the stripped brine 168 in the BAC filter 184 generates a BAC filter backwash which may be combined with the BAC filter backwash stream 194 to form the total backwash stream 190 and the pretreated stream 20. The BAC filter wash stream 190 may contain one or more of the solid materials 30 such as, but not limited to, iron (Fe), manganese (Mn), magnesium silicate, organic matter, and combinations thereof that may be recovered and sold as commercially viable products (e.g. soil amendment). For example, the BAC filter wash stream 190 may be fed together with stream 28 to the first filter 32 for recovery of the solid materials 30.

As discussed above, the filtrate 34 may be recycled back to through the pretreatment system 12 to remove any residual fine solid or organic materials 30 that may pass the through the first filter 32 and into the filtrate 34. Accordingly, as shown in the illustrated embodiment, the filtrate 34 is combined with the stripped brine stream 168 and fed to the BAC filter 184. However, in other embodiments, the filtrate 34 may be fed directly to the BAC filter 184 without combining with the stripped brine stream 168. The filtrate 34 may be treated with the SBS 178 generated in the oxidizer/scrubber 172 to neutralize any bleach that may be present in the filtrate 34 from treating one or more streams generated in the pretreatment system 12 before directing the filtrate 34 to the BAC filter 184. Accordingly, residual bleach that may remain in the filtrate 34 is neutralized such that the active bacteria in the BAC filter are not affected.

As discussed above the BAC filter 184 generates the pretreated brine stream 20 after biological oxidation of dissolved organic components present in the stripped brine stream 168. The pretreated brine stream 20 may contain residual solids (e.g., the solid materials 30, carbon particles, and/or entrained microorganisms) that may need to be removed from the pretreated brine stream 20 prior to directing the pretreated brine stream 20 to the mineral removal system 46. Accordingly, the pretreated brine stream 20 is fed to the MF system 24 for removal of any remaining solid materials that may be present in the pretreated brine stream 20 after treating the stripped brine stream 168 in the BAC filter 184. As discussed in further detail below with respect to FIG. 4, in certain embodiments, the pretreated brine stream 20 may be directed to a mixing tank before being fed to the MF system 24. While in the mixing tank, the pretreated brine stream 168 may be treated with the NaOH 180 to facilitate removal of dissolved components of interest. In certain embodiments, the pretreated brine stream 20 may be treated with bleach 194 to disinfect (e.g., oxidize microorganisms that may have passed though the BAC filter 184) the pretreated brine stream 20. In addition, in certain embodiments, a pH of the pretreated brine stream 20 may be adjusted to an alkaline pH (e.g., a pH of between approximately 8 and 10) by adding the NaOH 180.

As discussed above, the MF system 24 generates the brine stream 42 from the pretreated brine stream 20. The brine stream 42 contains components of interest that may be commercially viable (e.g., salts, minerals). Accordingly, the brine stream 42 may be fed to the mineral removal system 46 to recover commercial grade components of interest from the brine stream 42. The brine stream 28 contains the residual solids and may be sent to the filter 32 along with the BAC filter and filter blowdown streams to recover commercially viable products in stream 30 as discussed above. The pretreatment system 12 removes the hydrocarbon and organic materials present in the feed stream 14 to produce the brine stream 42 that is suitable for treatment in the mineral removal system 46. Therefore, by treating the feed stream 14 in the disclosed pretreatment system 12, components present in the feed stream 14 that may affect the performance and/or efficiency of the mineral removal system 46 may be removed and recovered such that undesirable waste may not be generated. The disclosed pretreatment system 12 improves existing techniques for treating feed streams containing hydrocarbons, such as produced water, by treating the feed stream in a manner that removes suspended solids and hydrocarbons without generating waste byproducts that may require disposal. By removing the suspended solids and hydrocarbons from the feed stream 14, the pretreated brine stream 20 may be treated in the mineral removal system 46 without the risk of affecting components (e.g., filtration system, electrodialysis membranes, etc.) that form part of the mineral removal system 46, as discussed in further detail below.

Figure 3:
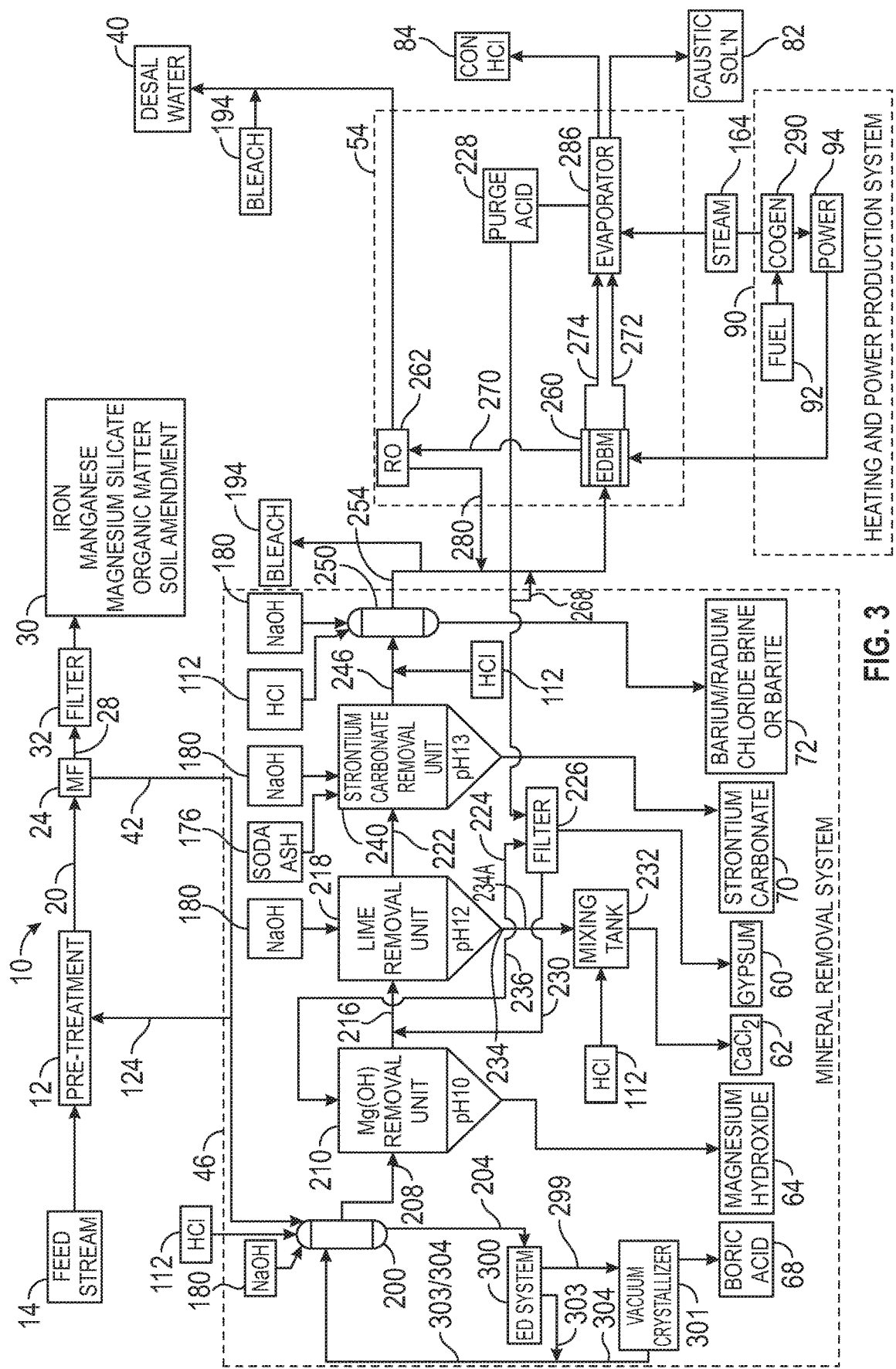
FIG. 3 is a block diagram of an embodiment of the water processing system of FIG. 1, wherein the mineral removal system of the water processing system is positioned downstream of the pretreatment system and includes a series of mineral removal systems for recovering minerals in the brine stream, in accordance with an embodiment of the present disclosure.

As discussed above, the brine stream 42 (e.g., MF permeate stream) includes minerals that may be recovered and sold for commercial use. Accordingly, the MF permeate stream 42 is fed to the mineral removal system 46 for recovery of the minerals and other desirable components present in the brine stream 42. In certain embodiments, the pretreated brine stream 20 may have a salt concentration similar to seawater. For example, the pretreated brine stream 20 may have a salt concentration (e.g., total dissolved solids (TOD)) of between approximately 1 percent and approximately 5 percent. In other embodiments, the pretreated brine stream 20 may have a salt concentration of approximately 15 percent or more. FIG. 3 is a block diagram of the system 10 that may be used to treat brine streams having a salt concentration greater than approximately 15 percent. In the illustrated embodiment, the mineral removal system 46 includes ion exchanges (e.g., softeners, ion specific absorbers) and a series of mineral removal systems that treat the brine stream 42 to remove and recover components, such as gypsum 60, calcium chloride ($CaCl_2$) 62, magnesium hydroxide ($Mg(OH)_2$) 64, boric acid 68, strontium carbonate 70, and barium/radium chloride brine and/or barite 72. For example, in the illustrated embodiment, the mineral removal system 46 includes a first ion exchanger 200 that receives the brine stream 42 from the MF system 24. The first ion exchanger 200 removes a substantial portion (e.g., approximately greater than 90%) of boron present in the brine stream 42. For example, the first ion exchange softener 200 selectively removes $B(OH)_3$ from the brine stream 42 to produce essentially boron free brine stream 208. In operation, a resin within the first ion exchanger 200 absorbs the $B(OH)_3$ and is periodically regenerated with hydrochloric acid 112 (e.g., between approximately 0.1 wt % and approximately 4 wt %) and sodium hydroxide 180 (e.g., between approximately 0.1 wt % and approximately 4 wt %) to generate a first effluent stream 204 containing the boric acid. The boric acid in stream 204 is treated in an electrodialysis (ED) unit 300 to remove dissolved salt impurities. An ED output stream 299 is fed a vacuum crystallizer 301 that vacuum crystalizes the ED output stream 299 to produce boric acid 68. Purge streams 303, 304 from the ED unit 300 and the vacuum crystallizer 301, respectively, containing dissolved salt impurities are recycled to the boric acid ion exchanger 200 to recover residual boron. In certain embodiments, the mineral removal system 46 may output between approximately 0.5 tons per day (TPD) and 1.5 TPD of the boric acid 68. The recovered boric acid 68 may be commercial grade boric acid that may be made available as a commercial product.

After boron removal divalent ions are selectively removed from the brine stream 208 by adjusting the pH. For example, certain divalent ions in the first concentrated brine stream 208 may be soluble or insoluble depending on the pH of the first concentrated brine stream 208. Therefore, by adjusting the pH of the first concentrated brine stream 208 with the NaOH 180 or by lime ($Ca(OH)_2$ extracted from the brine in the lime removal system 218 described below, certain divalent ions may be selectively removed and recovered from the first concentrated brine stream 208 while other divalent ions may remain solubilized in the first concentrated brine stream 208. For example, following removal of the divalent ions absorbed on the resin of the first ion exchange softener 200, the pH of the first concentrated brine stream 208 is adjusted to a pH of approximately 10 (e.g., by adding the NaOH 180 or lime 236). At a pH of approximately 10, divalent ions such as $Ca^{2+}$, $Sr^{2+}$, $Ba^{2+}$, and $SO_4^{2-}$ are soluble in the first concentrated brine stream 208. However, $Mg^{2+}$ ions are insoluble. As such, the NaOH 180 and the alkaline pH of approximately 10 may enable selective precipitation of $Mg(OH)_2$ from the first concentrated brine stream 208 in the $Mg(OH)_2$ removal unit 210. The precipitated $Mg(OH)_2$ is recovered to generate the $Mg(OH)_2$ 64 (between approximately 50 wt % to approximately 70 wt % $Mg(OH)_2$) and sold as an industrial grade product. The $Mg(OH)_2$ removal unit 210 may include a mixer, settler, and one or more filters that facilitate removal and recovery of the $Mg(OH)_2$ 64.

Following magnesium recovery in the $Mg(OH)_2$ removal unit 210, a first effluent brine stream 216 containing the solubilized divalent ions is directed to a lime removal unit 218. Similar to the $Mg(OH)_2$ removal s unit 210, the lime removal unit 218 may include a mixer, a settler, and one or more filters that facilitate removal and recovery of lime as a lime slurry stream 234 from the first effluent brine 216. For example, while in the lime removal unit 218, a pH of the first effluent brine stream 216 is increased from a pH of approximately 10 to a pH of approximately 12 by adding NaOH 180. At a pH of approximately 12, the $Ca^{2+}$ ions present in the first effluent brine stream 216 form lime ($Ca(OH)_2$ with the OH from the NaOH which is insoluble in the first effluent brine stream 216 and may precipitate as lime. Therefore, by adjusting the pH of the first effluent brine stream 216 to approximately 12, $Ca^{2+}$ ions present in the first effluent brine stream 216 may be selectively precipitated while other divalent ions (e.g., $Sr^{2+}$ and $Ba^{2+}$)$^-$ may remain solubilized in a second effluent brine stream 222 output by the lime removal unit 218. A portion (stream 236) of the lime slurry stream 234 may be used to adjust the pH of the magnesium hydroxide settler 210 described above, another portion (stream 224 is mixed with sulfate containing purge acid from the purge acid system 228 which causes gypsum ($CaSO_4$-$2H_2O$) to precipitate gypsum which is filtered in 226 producing gypsum filter cake 60 (agricultural grade gypsum with a $CaSO_4$—$H_2O$ content greater than 80%) and filtrate 230. The filtrate 230 is recycled to the lime removal unit to remove residual Ca in the filtrate.

In certain embodiments, another portion of the lime slurry (stream 234a) may be fed to a mixing tank 232 downstream of the lime removal unit 218, as shown by arrow 234a. The lime slurry output stream 234 may contain excess $Ca^{2+}$ that may be recovered as $CaCl_2$. For example, the portion 234a of the lime slurry 234 may be treated with HCl 112 in the mixing tank 232 to generate the calcium chloride ($CaCl_2$) 62 (e.g., between approximately 25 weight percent (wt %) and 50 wt % $CaCl_2$). The $CaCl_2$ brine 62 may be made available as a commercial product as a brine or evaporator to a flake or pellet.

The lime removal unit 218 may remove approximately 80 percent to approximately 95 percent of the calcium received from the first effluent brine stream 216 as gypsum 60 and $CaCl_2$ 62, and produce the second effluent brine stream 222. As discussed above, the second effluent brine stream 222 includes solubilized ions, such as $Sr^{2+}$ and $Ba^{2+}$. Accordingly, the second effluent brine stream 222 is directed to a strontium removal unit 240 downstream of the lime removal unit 218. The second effluent brine stream 222 may be treated with the NaOH 180 in the strontium removal unit 240 to increase the pH from approximately 12 to approximately 13. In addition to treating the second effluent brine stream 222 with the NaOH 180, the second effluent brine stream 222 is treated with the soda ash 176. The increased pH (e.g., approximately 13) and the soda ash 176 enable selective precipitation of strontium carbonate 70 from the second effluent brine stream 222. The strontium carbonate 70 (e.g., approximately between 4 and 10 TPD) is recovered from treatment of the second effluent brine stream 222 in the strontium removal unit 240 and may be made available as a commercial product.

The strontium removal unit 240 outputs a sodium chloride (NaCl) brine stream 246. The NaCl brine stream 246 may be used to generate the HCl 112 and the NaOH 180 used to treat the various streams generated by the system 10. For example, the NaCl brine stream 246 may be directed to the HCl and NaOH production system 54 to generate the HCl 112 and the NaOH 180. However, the NaCl brine stream 246 may contain divalent ions that were not removed in the systems 210, 218, 240. For example, the NaCl brine stream 246 may contain naturally occurring radioactive materials (NORM), such as $Ba^{2+}$ and $Ra^{2+}$ ions that may have been present in the feed stream 14. The $Ba^{2+}$ and $Ra^{2+}$ ions may need to be removed from the NaCl brine stream 246 prior to feeding the NaCl brine stream 246 to the HCl and NaOH production system 54. Accordingly, present embodiments include treating the NaCl brine stream 246 with the HCl 112 to decrease the pH of the NaCl brine stream 246 from a pH of approximately 13 to a pH of approximately 9, and feeding the NaCl brine stream 246 to an ion exchange softener 250. the second ion exchange softener 250 removes divalent ions (e.g., $Ba^{2+}$ and $Ra^{2+}$) from the NaCl brine stream 246 upstream of the HCl and NaOH production system 54 to generate a softened NaCl brine stream 254 that is substantially free of divalent ions. Once the resin in the ion exchange softener 250 is saturated with the divalent ions, the on exchange softener 250 may be treated with the HCl 112 and the NaOH 180 to remove the divalent ions absorbed by the resin of the ion exchange softener 250 and regenerate the resin. For example, the saturated ion exchange softener 250 may be treated with the HCl 112 to release and generate the barium/radium chloride brine or barite 72. The barium/radium chloride brine may be disposed of due, in part, to the low quantity by which it is produced (e.g., less than or equal to approximately 10 gallons a day). In contrast, the barite that may be recovered from the NaCl brine stream 246 may be generated in an amount that is approximately 6 tons per year (TPY) and made available as a commercial product. Following removal of the divalent ions absorbed by the resin of the ion exchange softener 250, the ion exchange softener 250 is treated with the NaOH 180 to regenerate the resin and enable removal of the divalent ions in the NaCl brine stream 246.

As discussed above, the HCl and NaOH production system 54 receives one or more output streams 76 from the mineral removal system 46. Accordingly, in the illustrated embodiment, the HCl and NaOH production system 54 receives the softened NaCl brine stream 254 output by the second ion exchange softener 250. The HCl and NaOH production system 54 is configured to treat the softened NaCl brine stream 254 to generate the HCl 112 and the NaOH 180 circulated to various processes in the system 10. Additionally, the HCl and NaOH production system 54 is configured to generate the concentrated HCl 84 and caustic solution 82 that are made to be available as commercial products. For example, as illustrated in FIG. 3, the HCl and NaOH production system 54 includes an electrodialysis bipolar membrane (EDBM) 260, a reverse osmosis (RO) system 262, and an evaporator 264 that treat the softened NaCl brine stream 254 and generate the HCl 112, the NaOH 180, and the desalinated water 40, as discussed in further detail below.

In the illustrated embodiment, the softened NaCl brine stream 254 is directed to the EDBM 260 or other suitable membrane that facilitates separation of ions from a water source (e.g., the softened NaCl brine stream 254). By using the EDBM 260, or other similar membrane, to generate HCl (e.g., the concentrated HCl product solution 84), power consumption and capital costs associated with operation of the water processing system 10 may be decreased compared to systems that utilize other membranes (e.g., chlor-alkai membranes). In the illustrated embodiment, the EDBM 260 receives the softened NaCl brine stream 254 (e.g., approximately 5 to 15 weight percent NaCl) from the second ion exchange softener 250 within the water processing system 10. In other embodiments, the EDBM 260 may receive the softened NaCl brine stream 254 from a brine tank that may store the softened NaCl brine stream 254. In certain embodiments, the softened NaCl brine stream 254 may be treated with the NaOH 180 upstream of the EDBM 260. In other embodiments, the softened NaCl brine stream 254 may be treated with the purge acid 228, as shown by arrow 268. In one embodiment, a portion of the softened NaCl brine stream 254 may be used to generate the bleach 194 used in various processes of the system 10.

The EDBM 260 is configured to separate the salt ions (e.g., $Na^+$ and $Cl^-$) and to split water molecules into proton (e.g., $H^+$) and hydroxide (e.g., $OH^-$) ions to produce a corresponding acid (e.g., HCl) and base (NaOH). Accordingly, the EDBM 260 may output a dilute NaCl stream 270 (e.g., approximately 3 to 5 weight percent NaCl), a NaOH output stream 272 (e.g., approximately 8 to 10 weight percent NaOH) and an HCl output stream 274 (e.g., approximately 5 to 7 weight percent HCl). As should be noted, the NaOH output stream 272 and the HCl output stream 274 are generated directly from the softened NaCl brine stream 254. The dilute NaCl stream 270 may be directed to the RO system 262 to generate the desalinated water 40 and a concentrated NaCl stream 280 that is combined with the softened NaCl brine stream 254 and recycled to the EDBM 260. In certain embodiments, the desalinated water 40 may be treated with the bleach 194 to remove any residual bacteria that may present in the desalinated water 40.

As discussed above, the EDBM 260 also generates the HCl output stream 274. However, in certain embodiments, a concentration of HCl within the HCl output stream 274 may be less than desired (e.g., approximately less than 10 weight percent HCl) for commercial use. Accordingly, it may be beneficial to increase the HCl concentration in the HCl output stream 274 by between approximately 45 percent to approximately 86 percent to generate a cost effective concentrated HCl solution (e.g., approximately 15 to 22 weight percent HCl) that may be commercially viable. Accordingly, the HCl output stream 274 from the EDBM 260 is directed to the evaporation system 286 for concentration. The evaporation system 286 may include a multi-effect evaporator system or any other suitable evaporation system that may be used to concentrate the HCl output stream 274 and the NaOH product stream 272 to generate the concentrated HCl 84 and the caustic solution 82, respectively. The evaporator system 286 may generate the purge acid 228 which consists of the non-HCl components (e.g., sodium bisulfate, hydrofluoric acid, sodium chloride) generated during concentration of the HCl output stream 274. The heating and power production system 90 may generate the steam 164 used by the evaporation system 286 to concentrate the HCl output stream 274 and the NaOH product stream 272. For example, the heating and power production system 90 includes a cogen 290 (e.g., a heat engine or power station) that receives the fuel 92 to generate the power 94 and the steam 164 used in various processes of the system 10. The steam 164 heats the NaOH product stream 272 and/or the HCl output stream 274 to evaporate water present in the streams 272, 274 and concentrate the HCl and NaOH in the respective streams 272, 274.

Figure 4:
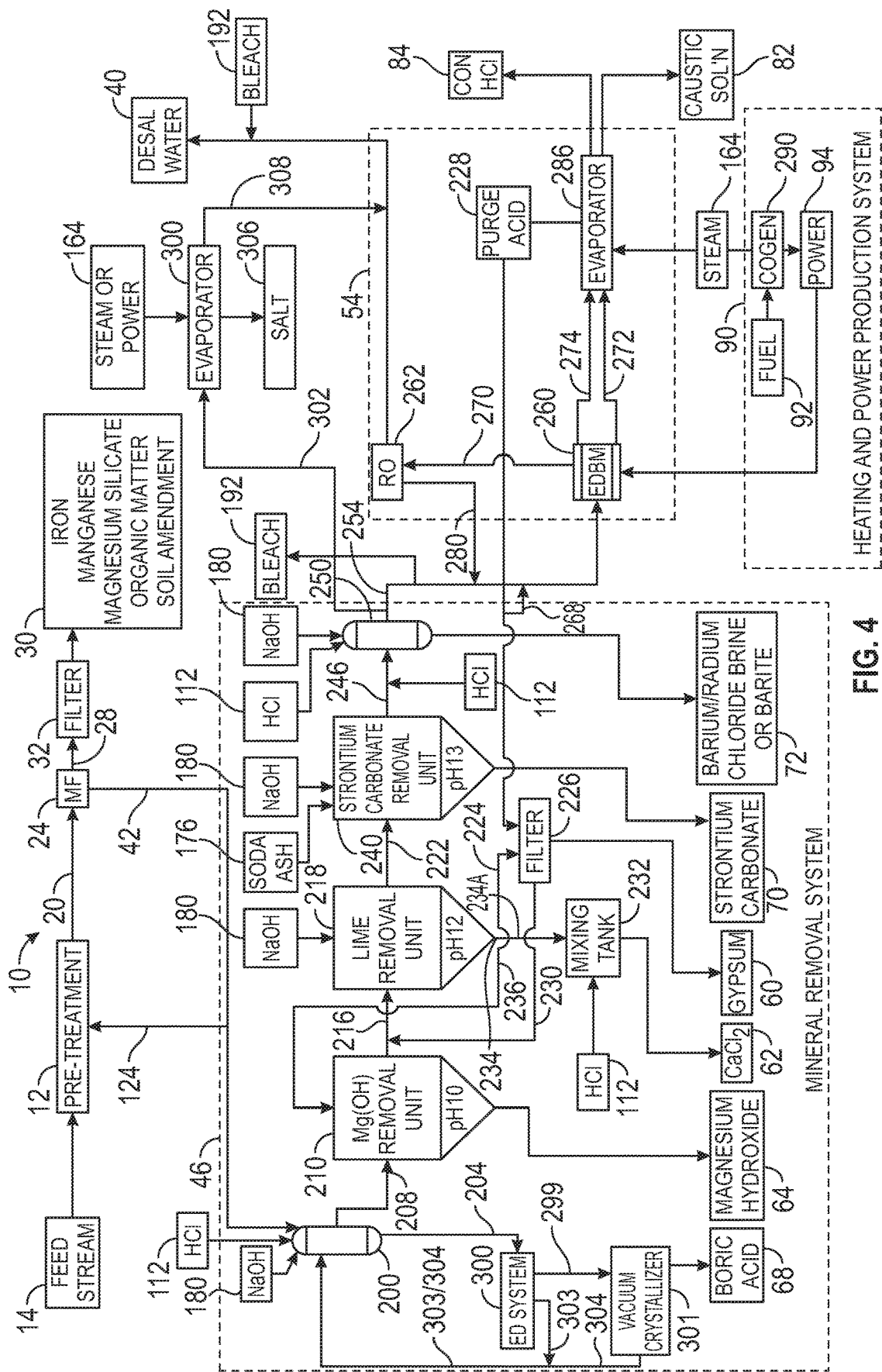
FIG. 4 is a block diagram of an embodiment of the water processing system of FIG. 3, wherein the water processing system includes an evaporator downstream of the mineral removal system for recovering salt from the brine stream, in accordance with an embodiment of the present disclosure.

In certain embodiments, the system 10 may include an additional evaporator that may be used to concentrate NaCl in the softened brine stream 254 to generate a NaCl salt that may be made available as a commercial product. For example, as illustrated in FIG. 4, the system 10 includes a second evaporator 300 fluidly coupled to the second ion exchange softener 250. In the illustrated embodiment, the second evaporator 300 receives a portion of the softened NaCl brine stream 254, as illustrated by arrow 302. The steam 164 and/or power generated by the heating and power production system 90 may be used to heat the softened NaCl brine stream 254, thereby causing the water in the softened NaCl brine stream 254 to evaporate and generate NaCl salt 306. Desalinated water vapor 308 output by the second evaporator 300 may be combined with the desalinated water 40 generated by the RO system 262.

As discussed above, in certain embodiments, the pretreated brine stream 20 output by the BAC filter 184 may be fed to a mixing tank rather than the MF system 24. For example, FIG. 5 is a block diagram of the system 10 in which the pretreated brine stream 20 is fed to a mixing tank 320 upstream of the MF system 24. In addition a combination of sulfuric acid and hydrochloric acid may be used to reduce the feed stream 14 pH. This allows sulfuric acid to be fed equimolar to the calcium in the calcium in the feed stream 14 allowing all the calcium to be recovered as gypsum (CaSO4-2H2O). As discussed above, certain feed streams (e.g., the feed stream 14) may have a total dissolved salts content that is similar to that of seawater (e.g., between approximately 1 percent and 5 percent). Therefore, the feed stream 14 may have a concentration of certain components that is not sufficient for recovery. For example, in certain embodiments, an amount of $Mg^{2+}$ ions present in the feed stream 14 may be less than approximately 10 percent. Accordingly, the amount of $Mg^{2+}$ may not be sufficient to recover in the $Mg(OH)_2$ removal unit 210. Rather, the $Mg^{2+}$ may be removed as $Mg(OH)_2$ in the brine stream 28. Accordingly, the pretreated brine stream 20 may be treated with the NaOH 180 in the mixing tank 320 to adjust the pH of the pretreated brine stream 20 and facilitate selective removal of dissolved salts (e.g., $Mg(OH)_2$) within the pretreated brine stream 20. Following treatment of the pretreated brine stream 20 with the NaOH 180 in the mixing tank 320, a treated brine stream 324 is fed to the MF system 24 to generate the brine stream 28 and the brine stream 42. The brine stream 28 includes $Mg(OH)_2$ precipitated from the treated brine stream 324. A pump 328 may be used to facilitate a flow of the treated brine stream 324 from the mixing tank 320 to the MF system 24.

In the illustrated embodiment, the brine stream 28 is fed to a solids removal unit 332 that may include a settler and/or filter to facilitate recovery of the solid materials 30 (e.g., $Mg(OH)_2$), magnesium silicate, gypsum, organic matter, etc.) in the brine stream 28. The solids removal unit 332 outputs a slurry 334 containing the solid materials 30 to a third filter 338 (e.g. a filter press or the like) via a pump 340. The third filter 338 separates the solid materials 30 from the water in the slurry 334, thereby generating an aqueous stream 346 and the solid materials 30. That is, the third filter 338 may remove water and dry the solid materials 30. In certain embodiment, the BAC filter wash stream 190 may be fed to the third filter 338. The composition of the solid material 30 recovered from the brine stream 28 may include, but is not limited to, manganese silicate, magnesium hydroxide ($Mg(OH)_2$), gypsum, organic matter, and soil amendment found in and/or generated from the feed stream 14. As discussed above, a total dissolved salt (TDS) content of the feed stream 14 may be between approximately 1 percent and approximately 5 percent, which is similar to the TDS of seawater. Accordingly, the amount of certain dissolved salts (e.g., $Mg(OH)_2$) may not be sufficient for harvesting (e.g., recovering as a commercial viable product) unlike a feed stream having in excess of 15 percent TDS, as described in the embodiments illustrated in FIGS. 3 and 4. A small amount of gypsum may be present in the brine stream 28 due, in part, to the recycle of the gypsum overflow 362 to the mixing tank 320.

The stream 346 may contain residual solid materials 30 that pass through the third filter 338. Accordingly, as illustrated, the aqueous stream 346 is recycled to the mixing tank 320. In addition to the aqueous stream 346, a first overflow stream 350 from the solids removal unit 332 may be recycled to the mixing tank 320. By recycling the streams 346, 350 to the mixing tank 320, additional solid materials 30 may be recovered and an amount of waste byproducts generated by the system 10 may be decreased or eliminated.

As discussed above, the MF system 24 generates the brine stream 42 that contains commercially viable salts that may recovered and made available as commercial products. Therefore, the brine stream 42 may be fed to a nanofiltration (NF) system 354. The NF system 354 may include one or more NF units (e.g., single stage, multiple stage, or a combination thereof) that separate the brine stream 42 into a low pressure permeate stream (e.g., between approximately 5 psig and approximately 20 psig) containing sodium chloride (NaCl) and a concentrated stream having the hardness and divalent compounds/elements (e.g., Ca and $SO_4$). In the illustrated embodiments, the NF system 354 generates an NF permeate stream 358 and an NF concentrated stream 360. The NF concentrated stream 360 is fed to the gypsum removal unit 364 to generate the gypsum 60. The gypsum removal unit 364 recovers the Ca and $SO_4$ from the NF concentrated stream 360, thereby generating the gypsum 60. The Ca and $SO_4$ in the NF concentrated stream 360 react in the gypsum removal unit 364 to precipitate the gypsum 60. In certain embodiments, approximately 50% to approximately 70% of the $SO_4$ in the NF concentrated stream 360 is removed. The presence of gypsum 60 seed crystals in the mixer (e.g., a turbulent mixer) of the gypsum removal unit 364 may facilitate gypsum precipitation kinetics, thereby enabling rapid gypsum precipitation. Moreover, in certain embodiments, the mixer may have a residence time of greater than approximately 2 hours. Therefore, the large residence time (e.g., greater than approximately 1 hour) in combination with turbulent mixing and a large solid content (e.g., greater than approximately 10 wt %), may enable formation of gypsum crystals having an average particle size of 100 microns or more. The larger gypsum crystals may facilitate removal of the gypsum 60 in the settler of the gypsum removal unit 364.

A gypsum overflow stream 362 may be routed to the mixing tank 320 and recycled through the MF system 24 and NF system 354, thereby increasing the efficiency of gypsum removal and recovery from the brine stream 42. For example, the gypsum overflow stream 362 may be enriched with Ca and $SO_4$. Therefore, by recycling the gypsum overflow stream 362 to the mixing tank 320, additional gypsum 60 may be recovered from the brine stream 42.

As discussed above, the NF system 354 generates the NF permeate stream 358 in addition to the NF concentrated stream 360. The NF permeate stream 358 includes between approximately 0.5 wt % and approximately 4.0 wt % NaCl. The NaCl in the NF permeate stream 358 may be used by the HCl and NaOH production system 54 for the production of the NaOH 180, the caustic solution 82, the HCl 112, and the concentrated HCl 84. However, before feeding the NF permeate stream 358 to the HCl and NaOH production system 54, the NF permeate stream 358 is fed to a second ion exchange softener 370 (e.g., a weak acid cation exchange softener or any other suitable ion exchange softener). The NF permeate stream 358 may include divalent ions (e.g., $Ca^{2+}$ and $Mg^{2+}$ that may have passed through the MF system 24 and the NF system 354. Therefore, feeding the NF permeate 358 to the second ion exchange softener 370 removes the divalent ions in the NF permeate stream 358, thereby generating a second softened NaCl brine stream 372 and a calcium and magnesium chloride brine stream 376. For example, as discussed above with respect to the first ion exchange softener 200, the second ion exchange softener 370 may be treated with the HCl 112 (e.g., between approximately 5 wt % to approximately 8 wt % HCl) and the NaOH 180 (e.g., between approximately 3 wt % and approximately 5 wt % NaOH) to regenerate the resin (e.g., release the absorbed calcium and magnesium), and generate the calcium and magnesium chloride brine stream 376. The calcium and magnesium chloride brine stream 376 may be fed to the gypsum removal unit 364 for recovery of the gypsum 60, as shown by arrow 380.

The second softened NaCl brine stream 372 is fed to an RO 382 (e.g., a sea water reverse osmosis (SWRO) or the like) to generate the desalinated water 40 and an RO concentrated brine stream 384. The RO concentrated brine stream 384 may contain NaCl, boron, and residual divalent ions (e.g., $Ca^{2+}$ and $Mg^{2+}$). The, boron, and residual divalent ions are removed from the RO concentrated brine stream 384 to avoid contaminating the HCl 84, 112, the NaOH 180, and the caustic solution 82 produced by the HCl and NaOH production system 54. Therefore, the RO concentrated brine stream 384 is fed to a softener 390 (e.g., a chelating softener) that removes the residual divalent ions and generates a softened RO brine stream 392 and additional calcium and magnesium chloride brine stream 376 (e.g., after regenerating the softener resin using the HCl 112 and the NaOH 180). The calcium and magnesium chloride brine stream 376 from the softener 390 is combined with the calcium and magnesium chloride brine stream 376 from the second ion exchange softener 370 and fed to the gypsum removal unit 364.

The softened RO brine stream 392 may contain boric acid that may need to be removed before feeding the softened RO brine stream 392 to the HCl and NaOH production system 54. Accordingly, the softened RO brine stream 392 is fed to a third ion exchanger 394. The third ion exchange softener 394 removes the boric acid 68 from the softened RO brine stream 392 (as described above), thereby generating the softened NaCl brine stream 254 that is substantially free of divalent ions. As discussed above, the softened NaCl brine stream 254 is fed to the EBDM 260 to generate the dilute NaOH output stream 272 and the HCl output stream 274, which are concentrated in the evaporator 86 to generate the caustic solution 82 and the concentrated HCl. The dilute NaCl stream 270 is combined with the second softened NaCl brine stream 372 and fed to the RO 382. In this way, the system 10 may treat the feed stream 14 (e.g., produced water) in a manner that removes and recovers various salts, minerals, and hydrocarbons present in the feed stream without generating a waste byproduct. Additionally, the system 10 may use the NaCl brine stream generated within the mineral removal system 46 for the production of HCl and NaOH in the HCl and NaOH production system 54, which can be used in various processes of the system 10.

Present embodiments also include a method that utilizes the system pretreatment system 12 and the mineral removal system 46 to treat the feed stream 14 (e.g., produced water) for the recovery of various chemical components present in the feed stream 14 and to generate commercially viable product in a manner that significantly reduces (or eliminates) undesirable waste byproducts. FIG. 6 is a flow diagram of a method 400 by which a system (e.g., the system 10 described above) may treat a feed stream (e.g., the feed stream 14) having containing hydrocarbons (e.g., produced water generated during hydrocarbon extraction processes in oil and gas wells). The method 400 uses a combination of filtration, ion exchange, and membrane systems to selectively precipitate salts and minerals from the feed stream and recover the salts and minerals that may be made available as commercial products. In addition, the method 400 generates concentrated HCl and caustic solution from a concentrated brine stream generated from the removal and recovery of salts and minerals. The method 400 includes adjusting a pH of a feed stream having hydrocarbons and brine to an acidic pH (e.g., approximately 3) to generate an acidified feed stream (block 402). For example, as discussed above, the feed stream 14 is treated with the HCl 112 upstream of the filtration system 110. The acidic pH of the feed stream 14 deactivates naphthenic acids that stabilize an emulsion between the hydrocarbons and the aqueous brine in the feed stream 14.

The method 400 also includes, separating the hydrocarbons from the brine in the acidified feed stream to generate a brine stream and a hydrocarbon stream (block 406). For example, the acidified feed stream is directed to a filtration system (e.g., the filtration system 110) that removes the hydrocarbons separated from the brine due to deactivation of emulsifiers (e.g., naphthenic acids) in the feed stream. In the filtration system, the brine passes through the filtration system, thereby generating the brine stream (e.g., the first brine stream 118). The separated hydrocarbons are removed from the filtration system as a hydrocarbon stream (e.g., the hydrocarbon stream 116) and directed to a hydrocarbon removal system (e.g., the hydrocarbon removal system 122).

The method 400 also includes recovering oil and suspended solids from the hydrocarbon stream (block 410). For example, as discussed above, a hydrocarbon stream (e.g., the hydrocarbon stream 116) is fed to mixing system (e.g., the mixing system 120) in which emulsifiers (e.g., naphthenic acids) are reactivated to solubilize the hydrocarbons and water present in the hydrocarbon stream. The emulsified hydrocarbon stream (e.g., emulsified hydrocarbon stream 132) is fed to a filter (e.g., the second filter 138) that removes suspended solids (e.g., the sand 16) from the emulsified hydrocarbon stream. Following removal of the suspended solids, the emulsifiers are deactivated by increasing a pH of a hydrocarbon filtrate stream (e.g., the hydrocarbon filtrate stream 140) such that the hydrocarbons present in the hydrocarbon filtrate stream are separated from the water. The hydrocarbons are recovered as oil (e.g., the recovered oil 18).

The method 400 further includes removing organic components from the brine stream to generate a treated brine (block 412). For example, as discussed above, the brine stream (e.g., the first brine stream 118) is fed to a stripper (e.g., the stripper 160) to remove volatile organic materials (e.g., the volatiles stream 170). The resultant stripped brine stream (e.g., the stripped brine stream 168) is fed to a BAC filter (e.g., the BAC filter 184) to biologically oxidize dissolved organic components in the stripped brine stream, thereby generating a pretreated brine stream (e.g., the pretreated brine stream 20) containing salts and minerals that may be recovered as commercially viable products in a mineral removal system (e.g., the mineral removal system 46).

The method 400 further includes selectively removing minerals from the pretreated brine stream by adjusting a pH of the pretreated brine stream to generate one or more mineral streams and a concentrated brine stream (block 418). For example, a pH of the pretreated brine stream (e.g., the pretreated brine stream 20) may be increased to an alkaline pH in a series of steps from a pH of 10 to a pH of 13 in a series of mineral removal units (e.g., the removal units 210, 218, 240) to selectively precipitate $Mg(OH)_2$ (e.g., the $Mg(OH)_2$ 64), $Ca(OH)_2$ 234 which is used to produce gypsum (e.g., the gypsum 60) and calcium chloride 62, and strontium carbonate (e.g., the strontium carbonate 70), as discussed above with reference to FIG. 3.

The method 400 further includes generating HCl and NaOH from the concentrated brine stream in an HCl and NaOH production system (block 420). For example, the concentrated brine stream (e.g., the softened NaCl brine stream 254) may be directed to the HCl and NaOH production system (e.g., the HCl and NaOH production system 54) in which the concentrated brine stream is treated with an EBDM system (e.g., the EBDM system 260) to split the NaCl in the concentrated brine stream and generate an HCl output stream (e.g., the HCl output stream 274) and an NaOH output stream (e.g., the NaOH output stream 272). The HCl and NaOH output streams may be concentrated in an evaporator (e.g., the evaporator 286) to generate concentrated HCl (e.g., the concentrated HCl 84) and a caustic solution (e.g., the caustic solution 82) that may be made available as commercial products. In this way, a hydrocarbon-containing feed stream may be treated to recovery oil, suspended solids, and dissolved minerals in a manner that substantially reduces (or eliminates) waste byproducts. In addition, salt (NaCl) in the hydrocarbon-containing feed stream may be concentrated to generate HCl and NaOH that may be sold as commercial grade products.

As described above, certain embodiments of the water processing system 10 may treat a hydrocarbon-containing feed stream to recover commercial grade minerals and produce a concentrated HCl (e.g., between approximately 4 to approximately 35 wt % HCl) and caustic solution (4-50 wt % NaOH) for commercial use. The water processing system 10 may treat the hydrocarbon-containing feed stream in a pretreatment system that includes filtration systems that separate hydrocarbons and other organic materials from the hydrocarbon-containing feed stream. The hydrocarbons separated from the hydrocarbon-containing feed stream may be recovered and made available as a commercial product. The resultant brine stream, having the hydrocarbons and other organic materials removed, may be processed in a mineral removal system that selectively removes commercially viable minerals (e.g., Mg(OH)2, gypsum, calcium chloride, strontium carbonate, among others) to generate a concentrated brine stream (e.g. a concentrated NaCl brine stream). The concentrated NaCl brine stream maybe used in an HCl and NaOH production system to generate concentrated HCl and caustic solution (e.g., NaOH) that may be made available as a commercial product. In this manner, the disclosed water processing system may treat hydrocarbon-containing feed streams (e.g., produced water generated from hydrocarbon extraction processes) to recover dissolved minerals and hydrocarbons such that an amount of waste generated in the process is significantly reduced (or eliminated).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A water processing system, comprising:
a pretreatment system configured to:
   receive a feed stream comprising oil and brine;
   receive an acidic stream having an acidic pH; and
   generate an acidified feed stream based on the acidic stream and the feed stream and output the acidified feed stream along an acidified feed stream flow path; and
   wherein the pretreatment system comprises one or more filters fluidly disposed along the acidified feed stream flow path, and the one or more filters are configured to:
      receive the acidified feed stream via the acidified feed stream flow path;
      separate the acidified feed stream into a hydrocarbon stream and a first brine stream, wherein the first brine stream comprises a plurality of minerals, and the hydrocarbon stream comprises water, the oil, and suspended solids; and
   wherein the pretreatment system is configured to:
      receive an alkaline stream having an additional pH, wherein the additional pH is greater than the acidic pH; and
      provide the alkaline stream to the hydrocarbon stream downstream of the one or more filters to generate an alkaline hydrocarbon stream; and
a mineral removal system fluidly coupled to and disposed downstream from the one or more filters, wherein the mineral removal system is configured to receive and remove the plurality of minerals from the first brine stream output from the pretreatment system, wherein the mineral removal system comprises a first mineral removal unit configured to remove a first portion of the plurality of minerals from the first brine stream and to generate a second brine stream; and
a hydrocarbon removal system disposed within the pretreatment system and fluidly coupled to and positioned downstream of the one or more filters, wherein the hydrocarbon removal system comprises one or more additional filters configured to:
   receive the alkaline hydrocarbon stream; and
   filter out one or more solids from the alkaline hydrocarbon stream to generate a recovered oil stream comprising the oil.

2. The system of claim 1, wherein the pretreatment system comprises a biological carbon activated (BAC) filter fluidly coupled to and disposed downstream from the one or more filters and upstream of the mineral removal system, wherein the BAC filter is configured to remove dissolved organic compounds from the first brine stream and to direct the first brine stream to the mineral removal system.

3. The system of claim 1, wherein the hydrocarbon removal system comprises a mixing system disposed upstream from the one or more additional filters, and wherein the hydrocarbon removal system comprises a skim tank fluidly coupled to and disposed downstream from the one or more additional filters, wherein the skim tank is configured to separate the oil from the water and to generate the recovered oil stream.

4. The system of claim 3, comprising a flow path extending between the skim tank and the one or more additional filters, wherein the flow path is configured to direct the water to the one or more additional filters.

5. The system of claim 1, wherein the first mineral removal unit comprises a magnesium hydroxide ($Mg(OH)_2$) removal system, and wherein the first portion of the plurality of minerals comprises $Mg(OH)_2$.

6. The system of claim 1, wherein the mineral removal system comprises a second mineral removal system disposed downstream from and fluidly coupled to the first mineral removal unit, wherein the second mineral removal system is configured to remove a second portion of the plurality of minerals from the second brine stream and to generate a concentrated brine stream, wherein the concentrated brine stream comprises sodium chloride (NaCl).

7. The system of claim 6, comprising a hydrochloric acid (HCl) and sodium hydroxide (NaOH) production system disposed downstream from and fluidly coupled to the second mineral removal system, wherein the HCl and NaOH production system is configured to receive the concentrated brine stream and to generate an HCl stream and an NaOH stream from the concentrated brine stream.

8. The system of claim 7, wherein the HCl and NaOH production system comprises an electrodialysis bipolar membrane (EDBM) configured to generate the HCl stream and the NaOH stream from the concentrated brine stream, and an evaporator downstream from and fluidly coupled to the EDBM, wherein the evaporator is configured to concentrate the HCl stream and the NaOH stream to generated a concentrated HCl solution and a concentrated NaOH solution.

9. The system of claim 1, wherein the mineral removal system comprises an ion exchange softener disposed upstream from and fluidly coupled to the first mineral removal unit.

10. The system of claim 1, wherein the one or more filters comprise an ultrafiltration system.

11. The system of claim 1, wherein the one or more filters comprise a microfiltration system.

12. A system, comprising:
a pretreatment system disposed within a water processing system, wherein the pretreatment system is configured to:
receive an acidic stream having an acidic pH;
receive a feed stream comprising oil and brine; and
generate an acidified feed stream based on the acidic stream and the feed stream and output the acidified feed stream along an acidified feed stream flow path; and
wherein the pretreatment system comprises one or more filters fluidly disposed along the acidified feed stream flow path, and the one or more filters are configured to:
receive the acidified feed stream via the acidified feed stream flow path;
separate the acidified feed stream into a hydrocarbon stream and a first brine stream, wherein the first brine stream comprises a plurality of minerals, and the hydrocarbon stream comprises the oil, water, and suspended solids; and
wherein the pretreatment system is configured to:
receive an alkaline stream having an additional pH, wherein the additional pH is greater than the acidic pH; and
provide the alkaline stream to the hydrocarbon stream downstream of the one or more filters to generate an alkaline hydrocarbon stream; and
a hydrocarbon removal system disposed downstream from and fluidly coupled to the one or more filters, wherein the hydrocarbon removal system comprises one or more additional filters configured to:
receive the alkaline hydrocarbon stream; and
filter out one or more solids from the alkaline hydrocarbon stream to generate a recovered oil stream comprising the oil; and
a mineral removal system fluidly coupled to a disposed downstream from the one or more filters and configured to receive and remove the plurality of minerals from the first brine stream and to output a concentrated brine stream, wherein the mineral removal system comprises at least one mineral removal unit configured to remove a first portion of the plurality of minerals from the first brine stream and to generate a second brine stream; and
a hydrogen chloride (HCl) and sodium hydroxide (NaOH) production system disposed downstream from and fluidly coupled to the mineral removal system, wherein the HCl and NaOH production system comprises an electrodialysis bipolar membrane (EDBM) configured to receive the concentrated brine stream and to generate and HCl stream and a NaOH stream from the concentrated brine stream.

13. The system of claim 12, wherein the hydrocarbon removal system comprises a mixing system disposed upstream from the one or more additional filters, and wherein the hydrocarbon removal system comprises a skim tank fluidly coupled to and disposed downstream from the one or more additional filters, wherein the skim tank is configured to separate the oil from the water.

14. The system of claim 13, comprising a flow stream extending between the skim tank and the one or more additional filters, wherein the flow stream is configured to direct the water to the one or more additional filters.

15. The system of claim 12, wherein the HCl and NaOH production system comprises an evaporator disposed downstream from and fluidly coupled to the EDBM, wherein the evaporator is configured to concentrate the HCl stream and the NaOH stream.

16. The system of claim 12, comprising a microfiltration system disposed between the pretreatment system and the mineral removal system, wherein the microfiltration system is configured to remove and recover solid materials from the first brine stream.

17. The system of claim 12, comprising an ion exchange softener disposed downstream from and fluidly coupled to the at least one mineral removal unit.

18. The system of claim 12, wherein the at least one mineral removal unit comprises a gypsum removal unit.

19. The system of claim 12, comprising a biologic activated carbon (BAC) filter disposed downstream from and fluidly coupled to the one or more filters, wherein the BAC filter is configured to biologically oxidize dissolved solids in the first brine stream.

20. The system of claim 19, comprising a stripper disposed between the one or more filters and the BAC filter, wherein the stripper is configured to remove volatile hydrocarbons from the first brine stream.

21. The system of claim 2, wherein the pretreatment system is configured to receive an additional acidic stream and provide the additional acidic stream downstream of the one or more additional filters of the hydrocarbon removal system.

\* \* \* \* \*